United States Patent [19]

Viera

[11] Patent Number: 4,654,703

[45] Date of Patent: Mar. 31, 1987

[54] VIDEO CAMERA SURVEILLANCE SYSTEM

[76] Inventor: William E. Viera, 9552 W. Wesley Dr., Denver, Colo. 80227

[21] Appl. No.: 801,142

[22] Filed: Nov. 22, 1985

[51] Int. Cl.[4] ........................ H04N 7/18; H04N 5/232

[52] U.S. Cl. ........................ 358/108; 358/229

[58] Field of Search ................ 358/108, 229; 343/757, 343/758; 354/293

[56] References Cited

U.S. PATENT DOCUMENTS

| | | | |
|---|---|---|---|
| 4,027,329 | 5/1977 | Coutta | 358/108 |
| 4,080,629 | 3/1978 | Hammond et al. | 358/229 |
| 4,233,634 | 11/1980 | Adams | 358/229 |
| 4,420,238 | 12/1983 | Felix | 354/293 |
| 4,474,439 | 10/1984 | Brown | 354/293 |
| 4,559,555 | 12/1985 | Schoolman | 358/108 |

FOREIGN PATENT DOCUMENTS

| | | | |
|---|---|---|---|
| 1125274 | 3/1962 | Fed. Rep. of Germany | 358/229 |
| 1088226 | 10/1967 | United Kingdom | 358/229 |

*Primary Examiner*—Howard W. Britton

*Attorney, Agent, or Firm*—Fields, Lewis, Pittenger & Rost

[57] ABSTRACT

A full viewing range system for video monitoring of a surveillance area. A first reversible drive preferably is suspended from an overhead support structure and has a first drive shaft that is free to rotate through a substantially full three hundred and sixty degree arc. A second drive is connected to the first drive shaft by an offset connecting member. The second drive is disposed perpendicular to the first drive and is offset a selected distance from the axis of rotation of the first drive shaft by the offset connecting member to center the second drive to one side of the axis of rotation. The second drive is free to rotate in substantially a three hundred sixty degree arc about said axis of rotation. A camera mounted on the second drive shaft is free to rotate in substantially a three hundred sixty degree arc thereon. The viewing axes of the camera are controlled preferably from a remote location by selectively rotating the drive shafts, providing a global view of the surveillance area.

14 Claims, 8 Drawing Figures

VIDEO CAMERA SURVEILLANCE SYSTEM

TECHNICAL FIELD

The present invention relates to video camera surveillance systems, for example for security purposes. Such systems are mounted at a vantage point, such as on a ceiling, from which a surveillance zone may be viewed.

BACKGROUND ART

The business need for surveillance of retail and industrial businesses to prevent theft is well established. In recognition of this problem, television cameras have been mounted at strategic locations within an establishment and have proved effective at reducing thievery. Surveillance systems are also adaptable to monitor persons entering and leaving a premises, as well as for monitoring employee performance and efficiency.

In U.S. Pat. No. 4,027,329, a surveillance system for retail stores is provided wherein the camera is mounted from a motor assembly described as being able to rotate the camera about both a vertical axis (pan) and a horizontal axis (tilt). The camera is also equipped with a zoom-type lens which is remotely controlled from a console. U.S. Pat. No. 4,233,634 discloses a camera tilt and a pan head including a bifurcated support that is pivotable about a vertical axis and a camera cradle pivotable about a horizontal axis. In U.S. Pat. No. 4,080,629, a video surveillance system is provided which has a bifurcated support for panning and which carries a camera cradle for tilting. A zoom-type lens on the camera is also disclosed. It is desirable to provide a surveillance system capable of covering a maximum viewing area, while at the same time having a structure which is efficient, easy to operate and install, and as inconspicuous as possible.

The present invention provides a system which allows a clear view in any direction. Further, its simple and efficient construction renders it light, inconspicuous and easy to install, operate and maintain.

DISCLOSURE OF THE INVENTION

In accordance with the present invention, a video camera surveillance system is provided for monitoring a surveillance zone from a vantage point. This system includes first and second drives, preferably identical to one another, each having a reversible motor and a gearbox for reducing the revolutions per minute of the motors, with a drive shaft extending therefrom. The first drive is mounted to a supporting structure, preferably by means of bolts attached to the structure at one of their ends and attached at the other end to a first flange located on the periphery of the first gearbox. An offset connecting member is mounted at one of its ends to the first drive shaft, and at its opposite end to the second drive. An offset portion of the connecting member displaces the center of the second drive from the axis of rotation of the first drive shaft. The second drive is free to rotate in substantially a three hundred sixty degree arc about the axis of rotation of the first drive shaft. A video camera is mounted on the second drive shaft and is freely rotatable in substantially a three hundred sixty degree arc about the axis of rotation of said second shaft. A remote control box enables the operator of the system to select the viewing axes of the camera by adjusting the positions of either one or both of the first and second drive shafts about their respective axes of rotation.

Additional aspects of this invention will become apparent from the description which follows, together with the accompanying drawings.

BEST MODE FOR CARRYING OUT THE INVENTION

Figure 1:
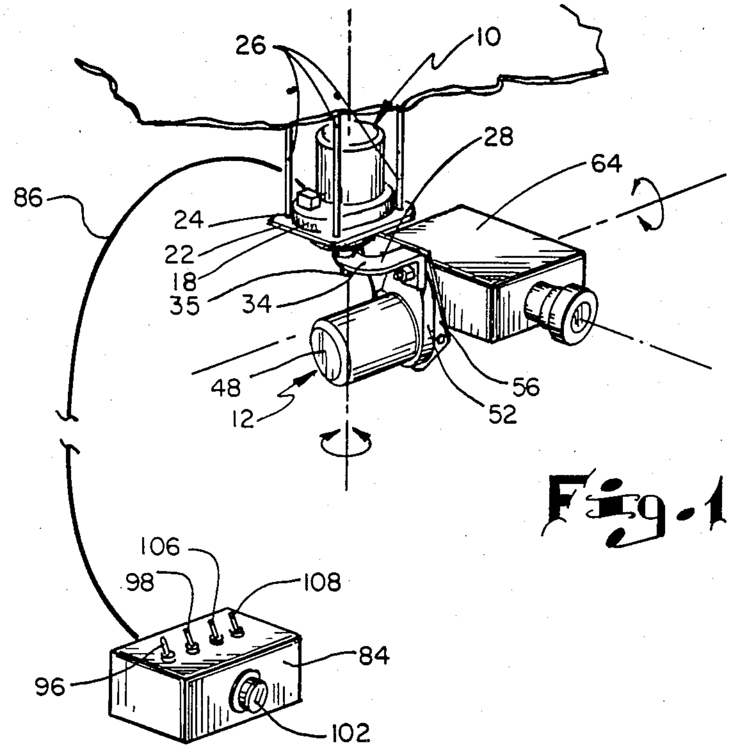
FIG. 1 is a perspective view of an embodiment of a surveillance system in accordance with the present invention.
Figure 2:
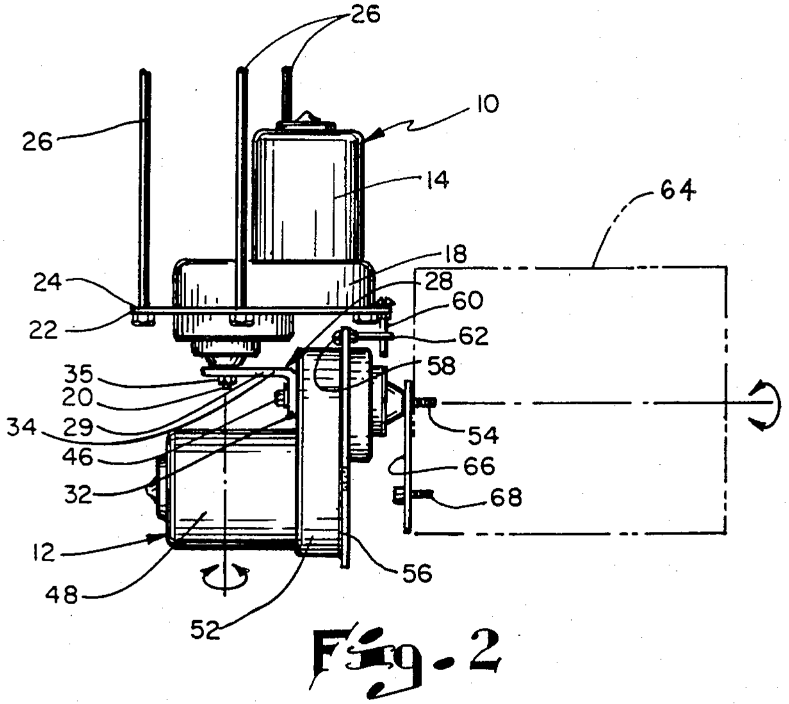
FIG. 2 is a side elevational view of the surveillance system shown in FIG. 1.

Referring to FIGS. 1–6, there is shown an embodiment of the present invention supported from an overhead position including a first drive 10 to which is connected a second drive 12. Preferably the two drives are identical and interchangeable. The first drive 10 includes a variable speed reversible first electric motor 14, preferably a DC motor, connected to a first gear box 18 which reduces the revolutions per minute of the motor 14. The gearbox 18 has a first drive shaft 20 extending vertically downward therefrom. A first flange 22 extends around the periphery of the gear box 18, and has three spaced holes 24 therein to serve as a mounting means for attaching to a support structure.

Three bolts 26 pass vertically through the holes 24 at one of their ends and are connected to the ceiling or other overhead support structure at their other end, thereby supporting the first drive 10 from the support structure.

Figure 3:
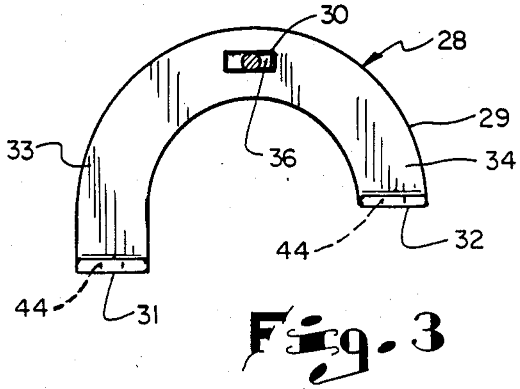
FIG. 3 is a front elevation view of the offset connecting member.

An offset connecting member 28 is connected between the drive shaft 20 and the second drive 12. This connecting member 28 includes an offset section 29 having a first mounting portion in the form of rectangular slot 30 in an end portion of member 28 and a second mounting portion opposite slot 30 in the form of spaced mounting flanges 31 and 32 that extend perpendicularly to the offset section 29. In the form shown, the offset section 29 is generally flat and U-shaped with legs 33 and 34 of uneven length supporting flanges 31 and 32, respectively. The drive shaft 20 passes through the slot 30, and the connecting member 28 is secured to the drive shaft 20 by a nut 35. Preferably the drive shaft 20 has a rectangular base 36 which fits into the rectangular slot 30 in the offset connecting member 28 to form a non-slip connection, as shown in FIG. 3. The offset section 29 extends perpendicularly to the drive shaft 20. Flanges 31 and 32 have holes 44 through which bolts 46 secure the offset connecting member 28 to the second drive 12.

The second drive 12 is free to rotate in substantially a three hundred sixty degree arc about the axis of rotation of the first drive shaft 20, with the center of said second drive being offset from said axis of rotation by the offset section 29 of the offset connecting member 28. The second drive 12 includes a second variable speed reversible electric motor 48. The motor 48, preferably a DC motor, is connected to a second gear box 52 which reduces the revolutions per minute of the motor 48 and has a second threaded drive shaft 54 extending horizontally therefrom. A second flange 56 extends around the periphery of the second gear box 52, and has spaced holes 58 therein.

A first stop bolt 60 is attached to the first flange 22 and extends vertically downward therefrom. A second stop bolt 62 is attached to the second flange 56 and extends horizontally therefrom. As the second drive 12 rotates in a given direction around the axis of rotation of the first drive shaft 20, the two stop bolts 60 and 62 will intersect, thereby preventing further rotation in that direction.

Figure 6:
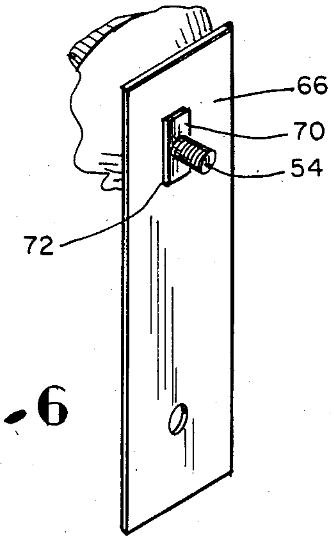
FIG. 6 is an enlarged perspective view showing the rectangular base of a threaded drive shaft showing it fitting into a corresponding rectangular slot on a camera support bracket.
Figure 4:
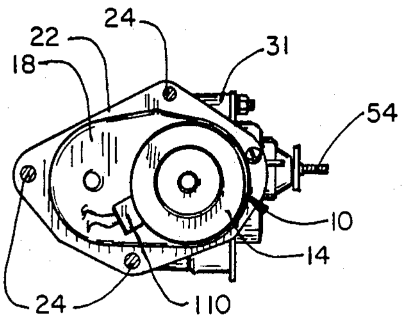
FIG. 4 is a top view of the two drives without the camera.
Figure 5:
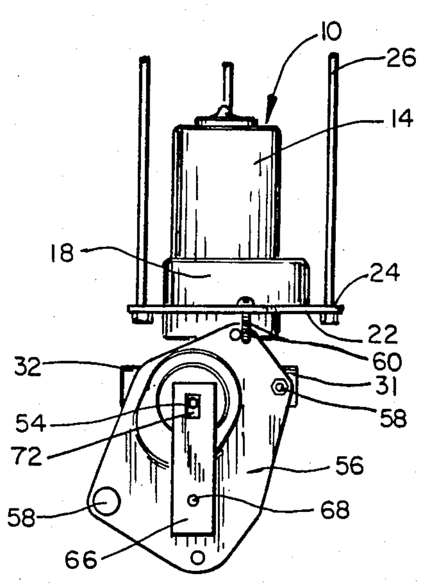
FIG. 5 is a front elevational view of the surveillance system shown in FIG. 1.
Figure 7:
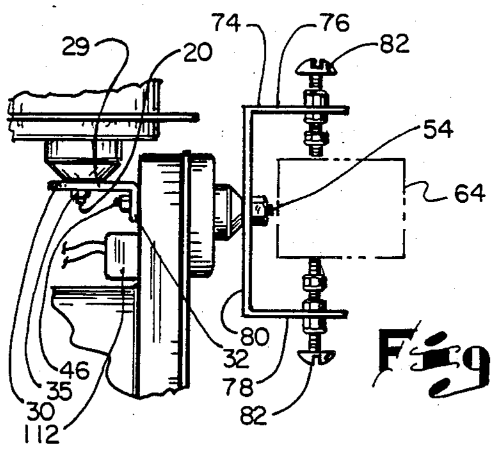
FIG. 7 is a partial side elevational view showing an alternative embodiment for the camera support.

A video or television camera 64 is threaded onto the second drive shaft 54 and rotates about the axis of rotation of said drive shaft 54 in substantially a three hundred and sixty degree arc. An elongated rectangular camera support bracket 66 is attached near one of its ends to the drive shaft and is bolted to the camera by bolt 68. The second drive shaft 54 has a rectangular base 70 which fits into a corresponding rectangular slot 72 in the camera support bracket 66 to form a non-slip connection, as shown in FIG. 6. Alternatively, as shown in FIG. 7, a camera support bracket may be used having a first side 76, a second side 78 opposite the first, with a third side 80 connecting the first two sides. In this embodiment, the third side 80 is mounted on the second drive shaft 54 and camera support screws 82 extend inward through the first side 76 and the second side 78, removably clamping the camera 64 between them.

A remote control box 84 is connected to the drives by a cable 86, providing control of the viewing axes of the camera 64 by selectively adjusting the rotation of either one or both of the drive shafts 20 and 54. This allows the camera to rotate in substantially a full three hundred sixty degree arc around both a horizontal and a vertical axis.

Figure 8:
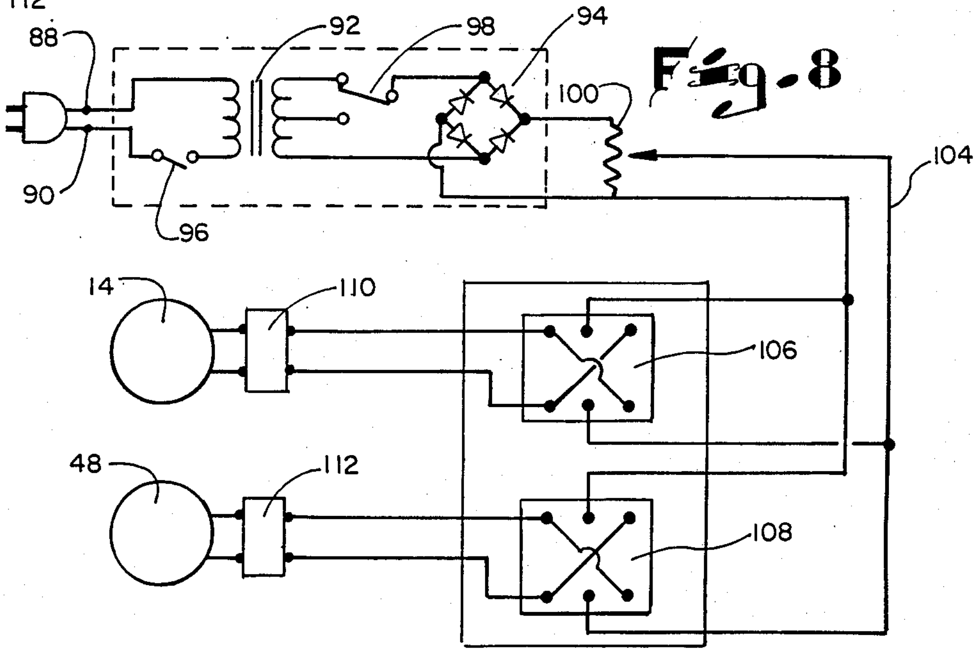
FIG. 8 is a schematic representation of the electrical control circuitry of the present invention.

The control circuit for the reversible motors 14 and 48 is contained in the remote control box 84 connected to the motors by a cable 86 as shown in FIG. 1. This control circuit, as shown in FIG. 8, includes input power terminals 88 and 90 to which is applied electric power, preferably 120 VAC.

A step-down transformer 92 having primary and secondary windings is connected between the power terminals and a full wave diode bridge 94 which converts AC voltage to DC voltage.

An on-off power switch 96 is connected in the primary side of the transformer to control the power to the circuit. A step-down switch 98 is connected between the secondary winding and the bridge to reduce the secondary voltage to the bridge if desired for slower speed operations.

A rheostat or variable resistor 100 having a rotary control knob 102 on the control box 84 is connected across the bridge 94 with a tap line 104 whereby the DC input across the resistor may be varied as for example from 0 to 15 VDC to vary the speed of the motors.

A double-pole double-throw momentary electric switch 106 on the control box 84 is connected between the output of the variable resistor 100 and drive motor 14. The center position is off for the switch and movement to one side rotates the motor in one direction and movement to the opposite side rotates the motor in the opposite direction.

Similarly, a double-pole double-throw momentary electric switch 108 on the control box 84 is connected between the output of the variable resistor 100 and drive motor 14. A connector 110 is shown connected between the switch 106 and motor 14 and a connector 112 is shown between the switch 108 and motor 48.

In operation, the apparatus is suspended from a vantage point overlooking a surveillance area. The operator controls the orientation of the camera 64 from a remote location, using control box 84. After turning on the apparatus by use of the on-off switch 96, the operator then selects an overall high or low speed of operation by use of the step-down switch 98. To move the camera 64, the operator selects an axis or axes of rotation and a direction of rotation by use of the double-pole double-throw switches 106 and 108. The speed of rotation is then controlled by use of the rheostat dial 102, thereby orienting the camera 64 to the desired view.

This invention has been described in detail with reference to a particular embodiment thereof, but it will be understood that various other modifications can be effected within the spirit and scope of this invention.

What is claimed is:

1. Surveillance apparatus comprising:

reversible first drive means including a first drive shaft adapted for rotation about a first axis of rotation and having mounting means for attachment to a supporting structure;

an offset connecting member including an offset section connected at one end portion to said first drive shaft and extending substantially perpendicularly away from said first drive shaft and having mounting flange means extending substantially perpendicularly away from an opposite end portion of said offset section;

reversible second drive means connected to said mounting flange means to locate the center of said second drive means at a location offset from the axis of rotation of said first drive shaft, said second drive means including a second drive shaft adapted for rotation about a second axis of rotation that is substantially perpendicular to said first axis of rotation;

a camera mounted on said second drive shaft and free to rotate in substantially a three hundred and sixty degree arc about said second axis of rotation; and control means for selectively adjusting the angular positions of either of said first and second drive shafts about their respective axes of rotation for adjusting the viewing axes of said camera through two substantially mutually perpendicular planes in substantially a three hundred and sixty degree arc in each plane.

2. Surveillance apparatus as claimed in claim 1, wherein:

said first drive shaft extends substantially vertically downward and said second drive shaft extends laterally outward from one side of said first drive shaft.

3. Surveillance apparatus as claimed in claim 1, wherein:

said first and second drive shafts have threaded end portions; and said camera has an internally threaded portion into which said threaded end portion of said second drive shaft is threaded.

4. Surveillance apparatus as claimed in claim 1, wherein said mounting means includes:

a flange extending around the periphery of said first gearbox, said flange having spaced holes therein for receiving bolts extending through said holes for attaching said first drive to an overhead supporting structure.

5. Surveillance apparatus as claimed in claim 1, further including:

a first stop member extending from said first drive in a direction parallel to said first drive shaft;

a second stop member extending from said second drive in a direction parallel to said second drive shaft, said second stop member intersecting with said first stop member as said second drive rotates in a given direction around the axis of rotation of said first drive shaft, thereby preventing further rotation in that direction.

6. Surveillance apparatus as claimed in claim 1, wherein said offset connecting member includes:

an offset section with a pair of spaced legs connected to one another and having a first mounting portion in the form of a slot through which said first drive shaft extends and is fastened to said offset section, and a second mounting portion opposite said first mounting portion in the form of mounting flanges extending at substantially right angles to said offset section.

7. Surveillance apparatus as claimed in claim 1, further including:

a camera support bracket having a first side and a second side directly opposite one another, with a third side extending therebetween, said bracket being mounted at its third side on said second drive shaft;

a first camera support screw extending inward through said first side; and a second camera support screw extending inward through said second side substantially in line with said first camera support screw, said first and second support screws cooperating to removably clamp a camera therebetween.

8. Surveillance apparatus as claimed in claim 1, wherein said control means is in the form of a control box having a control knob to adjust the speed and electric switch levers to control the direction of rotation.

9. Surveillance apparatus as claimed in claim 1, wherein said first and second drive means each include variable speed DC electric motors and a speed-reducing gear between an output shaft of each motor and the associated drive shaft to provide a low rpm for each drive shaft.

10. Surveillance apparatus as claimed in claim 9, wherein said control means includes a bridge to convert AC power to DC power, a variable resistor to vary the output voltage from the bridge and first and second reversible electric switches between the variable resistor and each DC motor to operate the motors for rotation in either direction.

11. Surveillance apparatus as claimed in claim 10, wherein said electric switches are double-pole, double throw momentary electric switches that are off in a center position and on when moved to a side position.

12. Surveillance apparatus as claimed in claim 11, wherein said control means is located remote from said drive means.

13. Surveillance apparatus as claimed in claim 11, further including:

an elongated support bracket mounted at one end on said second drive shaft and attached to said camera at at least one point displaced from said drive shaft, said second drive shaft having a rectangular base;

said support bracket having a rectangular slot fitted over said base to prevent said bracket from rotating relative to said shaft; and a nut threaded onto said second drive shaft and securing said bracket to said second drive shaft.

14. Surveillance apparatus comprising:

reversible first drive means including:

a first reversible variable speed DC electric motor;

a first speed-reducing gearbox connected to said motor;

a first drive shaft having a threaded end portion and extending vertically downward from the gearbox, said drive shaft having a substantially rectangular base portion and being adapted for rotation about a first axis of rotation;

an offset connecting member having an offset section having a pair of spaced legs connected to one another and a rectangular mounting slot in a connecting portion between said legs through which said first drive shaft extends and is fastened to said offset section, said legs having mounting flanges opposite said mounting slot and extending at substantially right angles to said offset section, said connecting member extending substantially perpendicularly away from said first drive shaft;

a first flange around the periphery of said first gearbox, said flange having spaced holes therein;

bolts extending vertically through said holes and attaching said first drive to an overhead supporting structure;

reversible second drive means connected to said offset mounting flange to locate the center of said second drive means at a location offset from the axis of rotation of said first drive shaft, said second drive means including:

a second reversible variable speed electric motor;

a second speed-reducing gearbox connected to said motor;

a second drive shaft having a threaded end portion and extending horizontally from the gearbox, said drive shaft having a substantially rectangular base portion and being adapted for rotation about a first axis of rotation;

a video camera having threaded mounting means and being mounted thereby on said second drive shaft to be free to rotate conjointly with said drive shaft in substantially a three hundred and sixty degree arc around said axis of rotation;

an elongated rectangular camera support bracket mounted near one of its ends on said second drive shaft and attached to said camera at at least one point displaced from said drive shaft;

adjustable control means remote from said drive means for selectively adjusting the angular positions of either of said first and second drive shafts about their respective axes of rotation for adjusting the viewing axes of said camera through a vertical and a horizontal plane in sustantially a three hundred and sixty degree arc in each plane;

a first stop member extending vertically downward from said first drive; and a second stop member extending horizontally from said second drive, said second stop member intersecting with said first stop member as said second drive rotates in a given direction arond the axis of rotation of said first drive shaft, thereby preventing further rotation in that direction.

* * * * *